United States Patent
Lu et al.

(10) Patent No.: US 7,224,704 B2
(45) Date of Patent: May 29, 2007

(54) WIRELESS NETWORK SCHEDULING DATA FRAMES INCLUDING PHYSICAL LAYER CONFIGURATION

(75) Inventors: Xiaolin Lu, Plano, TX (US); Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1114 days.

(21) Appl. No.: 10/222,477

(22) Filed: Aug. 16, 2002

(65) Prior Publication Data

US 2003/0185241 A1 Oct. 2, 2003

Related U.S. Application Data

(60) Provisional application No. 60/369,004, filed on Apr. 1, 2002.

(51) Int. Cl.
*H04J 3/00* (2006.01)

(52) U.S. Cl. ............. 370/476; 370/334; 370/338; 370/346

(58) Field of Classification Search ............ None
See application file for complete search history.

(56) References Cited

U.S. PATENT DOCUMENTS 5,612,960 A  3/1997  Stevens et al.
6,463,096 B1 * 10/2002 Raleigh et al. ............. 375/225
6,493,545 B1 * 12/2002 Sugaya ...................... 455/272
6,754,195 B2 * 6/2004 Webster et al. ............. 370/335
6,760,882 B1 * 7/2004 Gesbert et al. ............. 714/774
2001/0055283 A1 12/2001 Beach
2002/0193146 A1 * 12/2002 Wallace et al. ............. 455/562
2003/0072452 A1 * 4/2003 Mody et al. ................ 380/274

FOREIGN PATENT DOCUMENTS

EP       1189389 A     3/2002
WO   WO 03/017608 A   2/2003

OTHER PUBLICATIONS

Alamouti, A Simple Transmit Diversity Technique for Wireless Communications, IEEE, pp. 1451-1458, 1998.*

* cited by examiner

*Primary Examiner*—Frank Duong
(74) *Attorney, Agent, or Firm*—Steven A. Shaw; W. James Brady; Frederick J. Telecky, Jr.

(57) ABSTRACT

A wireless network is disclosed in which individual wireless stations can be configured to implement any of a plurality of physical configurations including antenna configurations. Such antenna configurations may include, without limitation, multiple input multiple output (MIMO) and single input single output (SISO). Different types of MIMO configurations can also be implemented such as open loop MIMO and closed loop MIMO.

17 Claims, 3 Drawing Sheets

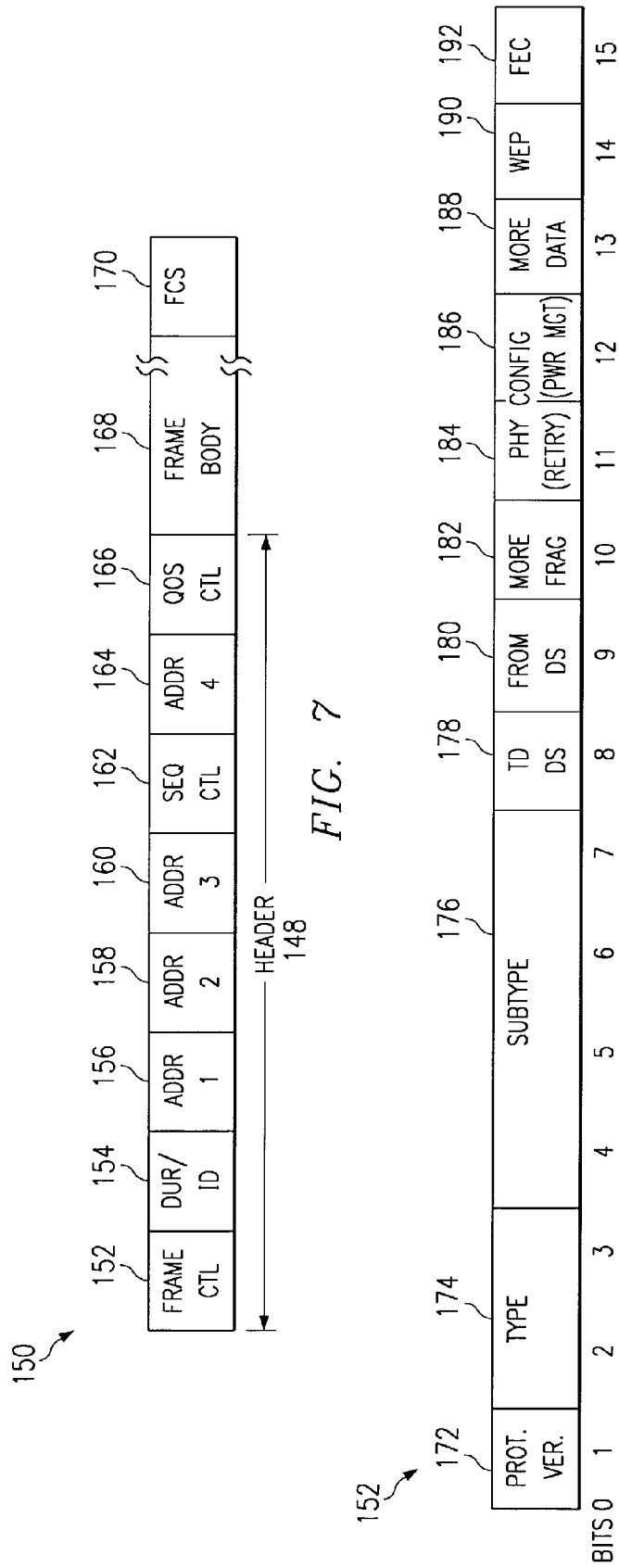

WIRELESS NETWORK SCHEDULING DATA FRAMES INCLUDING PHYSICAL LAYER CONFIGURATION

CROSS-REFERENCE TO RELATED APPLICATIONS

This application is a non-provisional application claiming priority to provisional application Ser. No. 60/369,004, filed on Apr. 1, 2002, entitled "MIMO Enhancement Protocol Specification for 802.11e," the teachings of which are incorporated herein by reference. This application also contains some subject matter that may be somewhat related to non-provisional application Ser. No. 10/188,188, filed on Jul. 2, 2002, entitled "MAC Extensions for Smart Antenna Support," the teachings of which also are incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention generally relates to wireless communications. More particularly, the invention relates to medium access control (MAC) frames and mechanisms that permit wireless devices capable of more than one concurrent antenna configuration to be configured for any of such configurations via MAC frames sent by other wireless devices such as access points.

2. Background Information

Initially, computers were most typically used in a standalone manner. It is now commonplace for computers and other types of electronic devices to communicate with each other over networks. The ability for computers to communicate with one another has lead to the creation of small networks comprising two or three computers to vast networks comprising hundreds or even thousands of computers. Networks can be set up to provide a wide assortment of capabilities. For example, networked computers can be established to permit each computer to share a centralized mass storage device or printer. Further, networks enable electronic mail and numerous other types of services. Networks have been established in a wired configuration in which each entity on the network has a direct physical electrical connection to the network. More recently, advances in wireless technology has made it possible for network devices to communicate with others via radio frequency (RF) or other types of wireless media.

To implement a wireless network, each device (computer, access point, etc.) includes one or more antennas through which data is transmitted or received. One type of antenna configuration is referred to as single input, single output (SISO) and is depicted conceptually in FIG. 1. Two network stations 10 and 12 are shown in communication with each other. The stations could be computers, access points, and the like. In a SISO configuration, each station 10 and 12 includes a single antenna 14 and 16, respectively. Each station actually may have multiple antennas, but only one is used at a time. Data is communicated between the stations 10, 12 in an exchange sequence via the single wireless link 18.

An exemplary exchange sequence is illustrated in FIG. 2. One of the stations 10, 12 sends a data frame 20 to the other station which responds with an acknowledgment frame 22. The data frame may include a preamble 24, a header 26 and a data payload 28. Similarly, the acknowledgment frame 22 includes a preamble 30, a header 32 and a data payload 34. The data frame conveys data to the receiving station and the acknowledgment frame lets the sending station know that the data frame was correctly received. If the data frame was not correctly received (e.g., due to noise or interference), the sending station may resend the data frame.

The total elapsed time required for the data frame 20 and subsequent acknowledgment frame 22 to be transmitted in a SISO antenna configuration is shown in FIG. 2 as time $T_{SISO}$. To a certain extent, the information contained in data frame 20 may be transmitted in less time using a multiple input, multiple output (MIMO) configuration such as that shown in FIG. 3. As shown, stations 10, 12 each includes a pair of antennas that communicate with the pair antennas on the other station. Thus, for example, antenna 40 can communicate with antennas 44 and 46 and antenna 42 also can communicate with antennas 44 and 46, thereby establishing four simultaneously available communication links 48, 50, 51 and 53 between stations 10 and 12. This type of MIMO configuration is referred to as a "2×2" MIMO configuration, and other types of MIMO configurations exist in which more than two antennas at each station are implemented such as "4×4" MIMO, etc.

The advantage of a MIMO antenna configuration is illustrated with regard to FIGS. 4a–4c. FIG. 4a simply repeats the SIS(frame exchange sequence from FIG. 2. As noted above, the time required to transfer the data and acknowledgment frames is $T_{siso}$. FIGS. 4b and 4c depict the frame exchange sequence using the 2×2 MIMO antenna configuration of FIG. 3. With MIMO, the bit stream can be broken into two parts and the parts can then be transmitted simultaneously via the four communication links 48, 50, 51 and 53. Thus, the overall time required to transfer the same information is advantageously reduced. In FIG. 4c, the total time is shown as $T_{MIMO}$, which is less than $T_{SISO}$. The time savings largely comes from being able to divide the data payload 28 of the data frame 24 into two smaller fields 52 and 54. Various techniques are known for doing this such as putting all of the even bits of data field 28 into field 52 and the odd bits into field 54. At the receiving station, the data parts 52 and 54 then can be reassembled into a single data payload. Although the data field can be broken up and transmitted concurrently, the preamble and header fields 24 and 26 cannot be broken apart. Nevertheless, significant time is saved in transmitting the frame in a MIMO configuration as opposed to a legacy SISO configuration.

It is generally desirable to provide wireless networks that can be configured as flexibly as possible. For example, it might be desired for some stations to be SISO only while other stations are capable of MIMO communications, thereby implementing a mixed MIMO/SISO wireless network. Further still, of the MIMO stations, it might be desirable for some stations to be configured as 2×2 MIMO, while other MIMO stations are 4×4 MIMO. It might also be desirable for some stations to reconfigure themselves for different types of MIMO or SISO configurations during operation as they communicate with other stations on the network. In general, MIMO stations may not know in advance which antenna configuration should be used to receive an incoming frame from the air or to transmit a frame to another station or even which operational mode (e.g., open loop MIMO, close loop MIMO, beam forming, etc.) to use. Moreover, a solution to this problem is desirable.

BRIEF SUMMARY OF THE PREFERRED EMBODIMENTS OF THE INVENTION

The preferred embodiments of the present invention solve the problems noted above by a wireless network in which individual wireless stations can be configured to implement any of a plurality of physical configurations including antenna configurations. Such antenna configurations may include, without limitation, multiple input multiple output (MIMO) and single input single output (SISO). Different types of MIMO configurations can also be implemented such as open loop MIMO and closed loop MIMO.

In accordance with a preferred embodiment of the invention, another station (e.g., an access point) configures a station for the desired physical configuration by forming and sending a communication frame to the station. The frame includes at least one bit in which the physical configuration information is encoded. The frame may comprise an existing polling frame type or a non-polling frame type. As a polling frame, the configuration information is encoded in a pair of bits that are used for other purposes in other frame types. Preferably, the polling frame is one of a plurality of types of quality of service (QoS) polling frames and the bits used to encode the configuration information otherwise are used to encode frame retry and power management information. As a non-polling frame, the frame preferably comprises one of a plurality of types of QoS non-polling frames and the configuration information is encoded in a field that is otherwise used to encode transmission opportunity time periods in other contexts.

In accordance with one aspect of the invention, a method is disclosed of implementing communication frames in a wireless network having a plurality of wireless devices in which some of the devices are capable of different physical layer configurations than other of said devices. This method comprises forming a polling frame including at least one bit in which physical layer configuration information is encoded, the configuration information being capable of specifying whether a SISO antenna configuration is to be used or a MIMO antenna configuration is to be used. The method further includes transmitting the polling frame to a receiving device for decoding by the receiving device and configuring a physical layer of the receiving device in accordance with the physical layer configuration information contained in the polling frame, wherein the polling frame also causes the receiving device to determine whether it has information to return.

In accordance with another aspect of the invention, a method is also disclosed of implementing communication frames in a wireless network having a plurality of wireless devices in which some of the devices are capable of different physical layer configurations than other of said devices. The method includes forming a non-polling frame including at least one bit in which physical layer configuration information is encoded, the configuration information being capable of specifying whether a SISO antenna configuration is to be used or a MIMO antenna configuration is to be used, transmitting the non-polling frame to a receiving device for decoding by the receiving device, and configuring a physical layer of the receiving device in accordance with the physical layer configuration information contained in the non-polling frame.

In yet another embodiment, a method is disclosed of coordinating the behavior of a plurality of wireless devices in a wireless network. The method comprises forming a frame to a wireless receiving device to specify the antenna configuration that the receiving device is to use for a subsequent communication, sending the frame to the receiving device, receiving the frame by the receiving device, decoding the frame, and configuring the receiving device to comport with the antenna configuration specified by the frame.

In yet other embodiments, access points and wireless stations are described which are used in accordance with the methods described herein. The preferred embodiments permit a mix wireless network to be implemented which includes both legacy SISO-only stations and stations capable of either SISO or MIMO configurations. The preferred embodiments efficiently coordinates the behavior of such devices to permit both types of antenna configurations to be used during run-time operation.

These and other aspects and benefits of the preferred embodiments of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which:

FIG. 7 shows an IEEE 802.11e quality of service (QoS) frame which can be used to encode physical layer configuration information;

FIG. 8 shows one embodiment of the invention in which the configuration information is encoded in a frame control field included in the frame of FIG. 7.

NOTATION AND NOMENCLATURE

Figure 1:
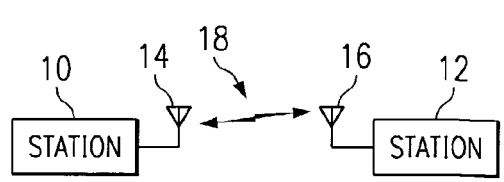
FIG. 1 shows two wireless devices communicating with each other using a single input, single output (SISO) antenna configuration.
Figure 3:
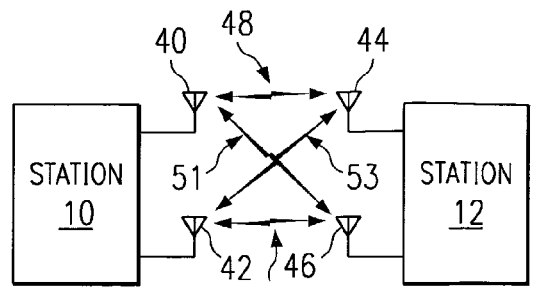
FIG. 3 shows the wireless devices of FIG. 1 communicating with each other using a multiple input, multiple output (MIMO) antenna configuration.
Figure 2:
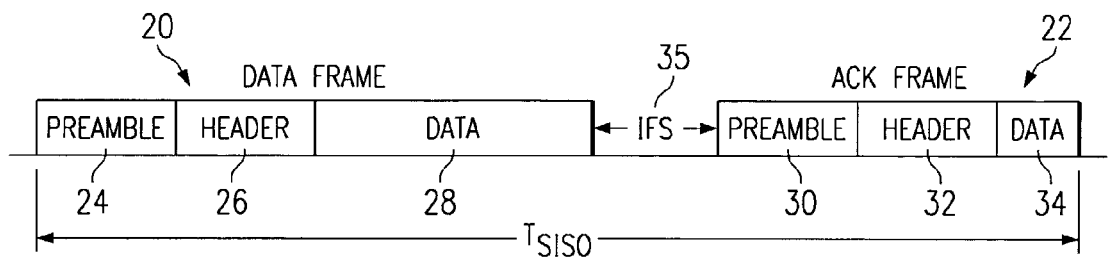
FIG. 2 shows a timing sequence associated with the SISO configuration.
Figure 4A:
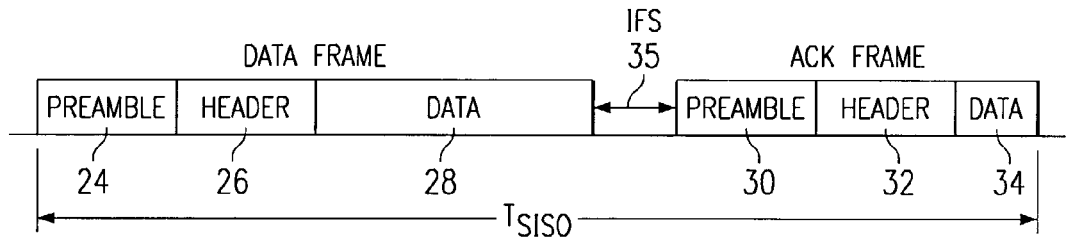
FIGS. 4a–4c show timing sequences associated with the SISO and MIMO antenna configurations of FIGS. 1 and 3.
Figure 4B:
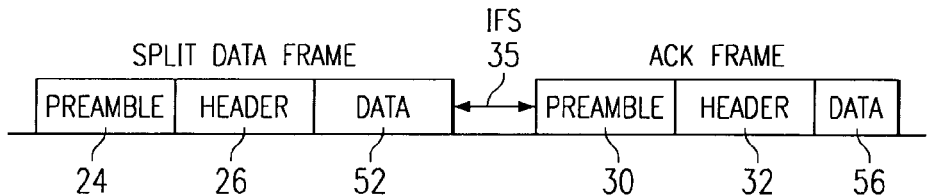
Figure 4C:
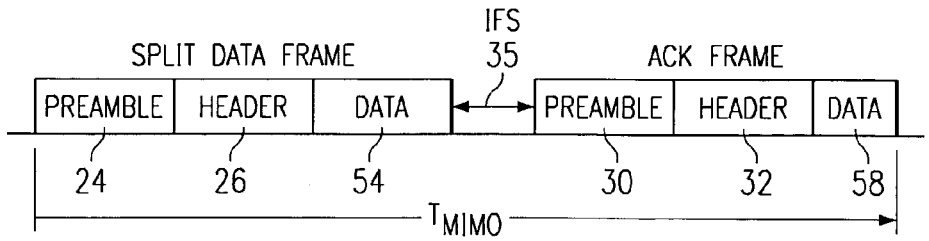

Certain terms are used throughout the following description and claims to refer to particular system components. As one skilled in the art will appreciate, manufacturers and suppliers of wireless technology may refer to components and sub-components by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either a direct or indirect electrical or wireless connection. Thus, if a first device couples to a second device, that connection may be through a direct electrical connection, or through an indirect electrical or wireless connection via other devices and connections. The term "frame" refers to a basic communication structure which includes overhead information and data information. Unless otherwise stated, the terms "station" and "device" generally refer to wireless stations (WSTAs) and access points (APs). To the extent that any term is not specially defined in this specification, the intent is that the term is to be given its plain and ordinary meaning.

DETAILED DESCRIPTION OF THE PREFERRED EMBODIMENTS

In accordance with the preferred embodiment of the invention, a wireless network is implemented which includes a plurality of wireless stations (both access points and non-access point stations). The antenna configuration of at least some of the stations is capable of being configured in any one of a plurality of configurations. The network may include other stations that are not capable of being so configured. For example, some of the stations may be capable of SISO and MIMO antenna configurations while other station have legacy only SISO antenna configurations. The preferred embodiment permits such disparate (i.e., incompatible) type of antenna configurations to be implemented among stations operable within the same wireless network. It should be further understood that in addition to, or instead of, the antenna subsystems of the stations being configurable, other aspects of the interface between the station and the wireless medium may also be configurable.

The preferred embodiments of the present invention will be described below in the context of the 802.11 family of wireless standards. The 802.11 standard is formally known as the "ISO/IEC 8802-11 International Standard (ANSI/IEEE Std 802.11)" referred to herein as the "802.11 standard" for sake of convenience and incorporated herein by reference. It provides wireless medium access control (MAC) and physical layer (PHY) specifications. The 802.11e/D2.0a draft standard, incorporated herein by reference, defines, on the basis of the 802.11 standard, Medium Access Control (MAC) enhancements for quality of service (QoS). QoS generally refers to a set of services which permits multiple applications to run concurrently with the network infrastructure treating each application differently in terms of latency, bandwidth, priority, etc. QoS permits multiple applications to run with a total bandwidth that may otherwise not be enough to accommodate the needs of the applications. QoS permits, for example, a more latency-intolerant application to be run in a way that acknowledges and addresses the special latency requirements of that application relative to other applications. In general, network resources are allocated in a way that considers an special needs of the applications.

Figure 5:
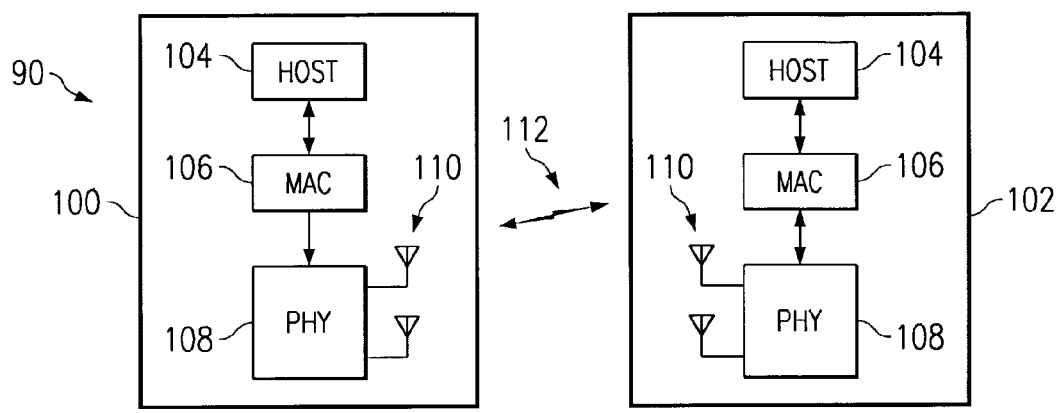
FIG. 5 shows a system diagram of a pair of wireless stations.

Referring to FIG. 5, a pair of wireless devices (also called "stations") 100 and 102 are shown comprising a wireless network 90. Although only two stations are shown in wireless network 90, in general the network can include more than two stations. Each station 100, 102 comprises host logic 104 (e.g., notebook computer, handheld computer, PDA, etc.) which communicates with another station via a wireless medium 112 using a MAC sublayer 106 and a PHY layer 108. The MAC sublayer 106 provides a variety of functions and services to facilitate effective wireless communications between stations. Examples of such services include data frame transmission and reception, security, and others. The host 104 uses these services to effectuate communications across the wireless medium 112. The PHY layer 108 provides an interface between the MAC layer 106 and the wireless medium and, as such, couples to one or more antennas 110. MAC and PHY layers are well known in the art and are described in greater detail in the 802.11 standard.

The currently adopted 802.11 standard defines a structure for various frame types such as control frames, data frames, and management frames. The discussion which follows describes various modifications to the 802.11 frame structure to include PHY configuration (e.g., MIMO, legacy SISO, etc) information when scheduling communications between wireless stations and/or access points. The preferred improvements described below have been made to existing frame structures so as to be able to use existing implementations as much as possible, thereby minimizing development time and cost. Further, the approach taken in the preferred embodiment in using existing frame types facilitates backward compatibility. Implementing such features in 802.11-compliant devices requires several variations from the currently adopted standard. These variations have been implemented in the following discussion and associated figures. It should be understood, however, that the scope of this disclosure and the claims that follow need not be limited to the 802.11 context.

In the context of 802.11, however, data frames are also referred to as MAC protocol data units (MPDUs). An MPDU generally comprises a MAC header, a data portion, and a frame check sequence (FCS) field. The PHY layer may add on a PHY preamble and a PHY header as described above. The data field contains a MAC service data unit (MSDU) or a fragment thereof. Based on network activity, a station's MAC, 106 may be programmed to fragment MSDUs in excess of a given length. Each fragment is transmitted in a separate frame with its own MAC header and FCS information as well as its own PHY header and preamble.

Figure 6:
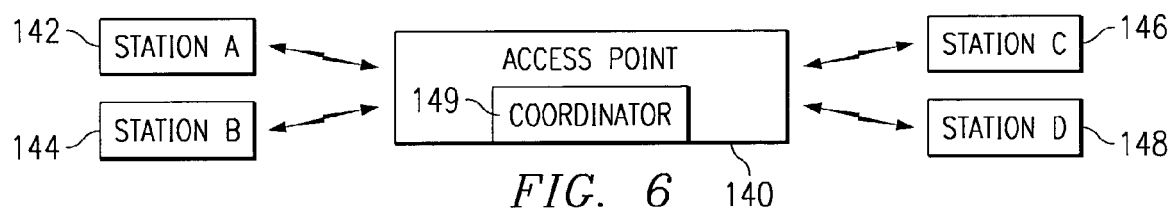
FIG. 6 shows an exemplary wireless network comprising a plurality of stations and an access point.

Referring to FIG. 6 for continued context, a wireless network comprises a plurality of stations 142–148, designated in FIG. 6 as Station A-Station D, respectively. The network also includes an access point (AP) 140 which provides connectivity to a wire- or/and wireline-linked distribution system. The AP 140 further contains a "coordinator" 149 which preferably performs bandwidth management and scheduling on the wireless medium. The coordinator 149 may be a so-called "hybrid" coordinator currently being proposed for the 802.11e/D2.0a draft standard.

The preferred embodiment of the invention provides the ability to configure the PHY configuration of a wireless station to implement either a legacy (SISO) or MIMO antenna configuration. The 802.11 standard includes a number of control, management and data frames some of which are used to coordinate the schedule for stations and access points to communicate with one another. In accordance with the preferred embodiment, some of these scheduling-oriented message frames are modified as described below, not only to schedule communications, but also to specify the PHY configuration to use during the communication.

It has been observed that certain bits in the MAC header are not used when forming QoS data frames. Some, or all, of these bits are normally used to perform certain functions, but are required to be set to certain predetermined values or are unused in QoS data frames. Consequently, these bits can be used in a different way and, more specifically, to encode PHY configuration information, including MIMO-related detail. FIG. 7 shows a QoS MAC frame 150. As shown, frame 150 comports with conventional 802.11 frame protocol in that it contains a MAC header 148, a frame body 168 and a frame check sequence (FCS) 170. The FCS 170 enables error detection and is implemented in accordance with conventional 802.11 protocol. Header 148 preferably includes a frame control field 152, a duration/ID field 154, four address fields 156, 158, 160 and 164, a sequence control field 162, and a QoS control field 166.

The frame control field 152 specifies various pieces of information such as the frame type and frame subtype destination address and will be described in further detail below with regard to FIG. 8. The duration/ID field is 16 bits in length and varies with frame type and subtype, superframe period and QoS capabilities of the sending station. In some frame types and subtypes, the duration/ID field carries the association identity (AID) of the station that transmitted the frame, while in other frame types, the duration/ID field carries a duration value that is indicative of the remaining number of microseconds of a transmission opportunity. The four address fields are generally used to indicate the basic service set identification (BSSID), source address (SA), destination address (DA), transmitting station address (TA) and receiving station address (RA) and are encoded in different ways depending on frame type. The sequence control field 162 generally comprises a sequence number and a fragment number. The sequence number uniquely identifies an MSDU and the fragment number identifies a sub-part or fragment of an MSDU. The QoS control field 166 preferably is a 16-bit field that identifies the traffic category or traffic stream to which the frame belongs and various other QoS-related information about the frame that varies by frame type and subtype. The frame body 168 represents the data payload of the frame and is used to store whatever data is desired to be transmitted.

Referring now to FIG. 8, the bits comprising frame control field 152 are shown in greater detail. The control field preferably includes a protocol version field 172, type and subtype fields 174 and 176, TO and FROM DS bits 178, 180, a more fragment bit 182, retry and power management bits 184 and 186, a more data bit 188, a Wired Equivalent Privacy (WEP) bit 190 and a forward error correction (FEC) bit 192. The numbers along the bottom of the frame control specify the bit numbers. The protocol version field 172 is used to indicate the version of the standard being implemented. The type and subtype fields 174 and 176 (bits 2–3 and 4–7, respectively) dictate the frame functionality and purpose. The TO and FROM DS bits 178, 180 indicate whether the frame is destined for the distribution system (DS) or is exiting the DS. The DS interconnects the various access points and other equipment necessary to implement a wireless network. The more fragment bit 182 specifies whether there are more fragments associated with the current MSDU to follow. The more data bit 188 specifies whether more MSDUs are buffered for the addressed station at an access point (AP) after the transmission of this frame. Bits 11 and 12 include the retry 184 and power management 186 bits and will be addressed in more detail below. The WEP bit 190 indicates whether the frame body contains information that has been processed by the WEP algorithm which is an 802.11 specified cryptographic confidentiality algorithm. Finally, the FEC bit 192 can be set to enable forward error correction as is commonly understood.

As noted above, the proposed QoS enhancements to the 802.11e MAC standard provides an enhanced set of functions, formats, frame exchange sequences and managed objects to support handling multiple applications each having different resource needs. The QoS enhancements include, in part, a set of eight QoS-related data frames. These frames are listed below in Table I along with the subtype bit values associated with each frame. The two type bits 3 and 2 preferably are set to '1' and '0', respectively, for all of the frame types listed in Table I to indicate the frames are all data frames. The subtype bits 7–4 differentiate one type of data frame from another and thus each QoS-related data frames have unique subtype values.

TABLE I

QoS Data Frames

| Frame Name | Subtype (bits 7654) | Description |
|---|---|---|
| QoS Data | 1000 | Transmits Data |
| QoS Data + CF-Ack | 1001 | Transmits data and acknowledges previous frame |
| QoS Data + CF-Poll | 1010 | Transmits data and polls device |
| QoS Data + CF-Ack + CF-Poll | 1011 | Transmits data and acknowledgment and polls device |
| QoS Null (no data) | 1100 | |
| QoS CF-Ack (no data) | 1101 | Transmits acknowledgment without data |
| QoS CF-Poll (no data) | 1110 | Polls device without transmitting data |
| QoS CF-Ack + CF-Poll (no data) | 1111 | Transmits acknowledgment and polls device without data |

In accordance with one embodiment of the invention, PHY configuration information is encoded in the QoS data poll frames which are used by the coordinator 149 in granting contention-free transmission opportunities (TX-OPs) to QoS-capable wireless stations (QSTAs). Further, it should be understood that the TXOP can also be granted during a contention period and thus the preferred embodiment applies to contention periods as well. Such data poll frames are generally referred to as the QoS Poll subtype frames and include the QoS CF-Poll (no data), QoS CF-Ack+CF-Poll (no data), QoS Data+CF-Poll, and QoS Data+CF-Ack+CF-Poll frames.

Referring again to FIG. 8, the retry bit 184 (bit number 11) is set to a value of 1, as dictated by the 802.11e standard, to indicate that the current frame contains a retransmission of an earlier frame (that, for example, was not received due to a transmission error). The 802.11e standard further specifies that the retry bit should be set to a value of 0 for all other frames. The 802.11e standard further specifies that the power management bit 186 (bit number 12) is used to encode the power management mode of the station. The standard states that the value of this field should remain constant in each frame from a particular station within a frame exchange sequence. The value indicates the mode in which the station will be after the successful completion of the frame exchange sequence.

It has been determined that that the retry and power management bits (bits 11 and 12) are not used in the QoS poll subtype frames. As such, and in accordance with the preferred embodiment, the retry and power management bits are combined into a single field and used to encode PHY configuration information. Thus, the preferred embodiment of the invention uses the retry bit and power management bit in the QoS poll subtype frames contrary to their prescribed usage, although such bits are still used for their stated purpose (retry, power management) in other types of frames. Any one of a variety of encoding methodologies can be used and exactly what PHY configuration information is encoded can be determined by the individual designer. One exemplary encoding scheme is shown in Table II below.

TABLE II

PHY Configuration Encoding

| Bit 11 (previously Retry) | Bit 12 (previously Pwr Mgt) | PHY Configuration |
|---|---|---|
| 0 | 0 | Legacy MIMO |
| 0 | 1 | |
| 1 | 0 | Closed loop MIMO |
| 1 | 1 | Open loop MIMO |

In this way, a station can be polled and the polling frame also specifies the PHY configuration that should be implemented by the polled station (i.e., the station receiving the QoS poll subtype frame) for a future frame communication. The polled station thus is requested to respond with an acknowledgment or data, if present, using the specified PHY configuration. If the polled station has MIMO capability, the polling station can command the polled station to respond with its MIMO capability. The polled station implements the specified PHY configuration when transmitting frames to the station whose MAC address matches the receive address which preferably is encoded into address 4 field 164. The QoS control field, which will be described in more detail below, includes a transmission opportunity (TXOP) field which specifies a value that is indicative of the amount of time a polled station has to send its frames in response to the polling frame. The polled station thus may send frames to other stations during this TXOP time period using the PHY configuration specified by bits 11 and 12 of the frame control field. The polled station may send frames to stations other than the station specified by address 4 using the legacy PHY configuration (i.e., SISO) and subject to the specified TXOP limit. This embodiment provides a mechanism to inform receiving stations of the PHY configuration to be tuned to in receiving frames in the specified time intervals. It applies to contention-free transmission in both the contention free period (CFP) and contention period (CP) which are periods well known to those of ordinary skill in the art.

Figure 9:
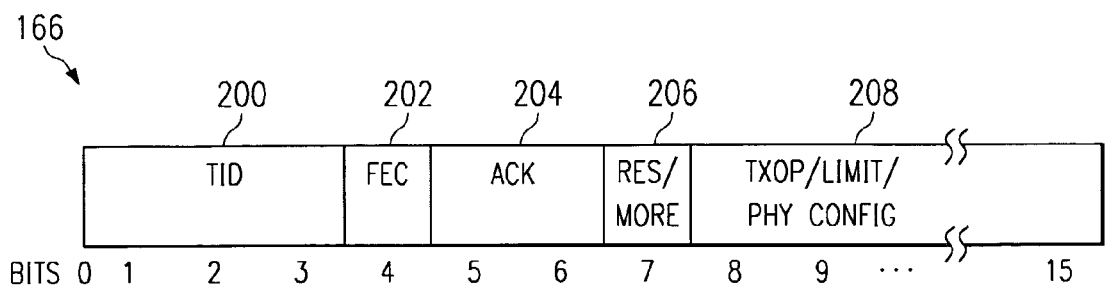
FIG. 9 shows another embodiment in which the configuration information is encoded in a QoS control field included in the frame of FIG. 7.

In accordance with another embodiment of the invention, an alternative method is used to convey PHY configuration information to a receiving station during the burst of data transmissions within a given TXOP. This alternative embodiment encodes PHY configuration information into the QoS control field 166 (FIG. 7) during QoS data non-poll frames. Referring now to FIG. 9, the QoS control field 166 includes a traffic identifier (TID) 200, an FEC bit 202, an ACK field 204, a reserved/more bit 206, and a TXOP limit/queue size field 208.

In QoS poll subtype frames, as discussed above, the TXOP limit/queue size field 200 specifies the time duration in which frame exchanges may be initiated by the polled station. In QoS data subtype frames containing no CF-Poll functionality (i.e., QoS Data, QoS Data+CF-Ack, QoS Null (no data), and QoS CF-Ack (no data)) that are transmitted by the hybrid coordinator, the TXOP limit/queue size subfield is reserved. In accordance with the 802.11e standard, QSTAs set this field to 0 at transmission and ignore this field upon reception. In QoS data subtype frames containing no CF-Poll functionality that are transmitted by a wireless QSTA (i.e., a non-HC QSTA), the TXOP limit/queue size field specifies the amount of traffic buffered for an outgoing traffic category or traffic stream as specified by the TID field 208 after the wireless QSTA transmits the frame indicating the queue size.

The FEC bit 202, together with the other FEC bit 192 in the frame control field 150, indicates whether the frame is FEC encoded at the MAC sublayer. The ACK field 206 defines the acknowledgment policy for the frame, indicating whether an immediate acknowledgment, a subsequent burst acknowledgment, or no acknowledgment is to be returned for the frame. The TID field 200 identifies the traffic category or traffic stream to which the data contained or indicated in the frame belongs.

As indicated above, bit 206 in the QoS control field 166 shown in FIG. 9 is currently reserved with regard to QoS data non-poll frames. In accordance with the preferred embodiment, however, this bit is used to indicate that another frame is to be transmitted from the same transmitting station to the same receiving station in at least three situations, namely:

(1) after a predetermined period of time following the current frame if no immediate acknowledgment is expected, (2) after a predetermined period of time following the immediate acknowledgment to the current frame if an immediate acknowledgment is expected, or (3) after a predetermined period of time following a burst acknowledgment to the current and previous frames if a burst acknowledgment request and a burst acknowledgment are to be expected after the current frame (burst acknowledgment is described in detail in copending application entitled "A Method and System for Group Transmission and Acknowledgment", incorporated herein by reference).

Preferably, the bits in field 208 (TXOP limit/queue size) of a QoS data non-poll frame are set to a non-zero value to encode the PHY configuration including the transmit antenna configuration such as SISO, MIMO, and the like, that is to be used in transmitting the next frame from this station if the reserved bit 206 in the QoS control field 160 is set to a value of 1. Alternatively, the field 208 is set in accordance with the 802.11e standard if bit 206 in the QoS control field of the current frame is set to 0.

The setting of the two subfields in the QoS control field 166 in QoS data non-poll frames enables the transmitting station to inform the receiving station of the PHY configuration to be used for the next frame between the two stations. This feature may be used with both contention-free and contention-based access.

Moreover, the embodiments described above incorporate MIMO antenna configuration capabilities into the 802.11e MAC specification with relatively minimal redesign. The embodiments are modifications to currently existing frame types.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of implementing communication frames in a wireless network having a plurality of wireless devices, some of said devices have different physical layer configurations than other of said devices, comprising:
    (a) forming a polling frame including at least one bit in which physical layer configuration information is encoded, said configuration information being capable of specifying whether a single input single output (SISO) antenna configuration is to be used or a multiple input multiple output (MIMO) antenna configuration is to be used;

(b) transmitting said polling frame to a receiving device for decoding by said receiving device; and (c) configuring a physical layer of said receiving device in accordance with the physical layer configuration information contained in the polling frame; wherein said polling frame also causes the receiving device to determine whether it has information to return.

2. The method of claim 1 wherein the polling frame includes more than one bit in which the physical configuration information is encoded.

3. The method of claim 1 wherein the polling frame includes two bits in which the physical configuration information is encoded.

4. The method of claim 3 wherein the two bits are used to encode retry and power management information in non-polling frames.

5. The method of claim 1 wherein the at least one bit in which the physical layer configuration information is encoded is used for a purpose other than to encode physical layer configuration information in non-polling frames.

6. The method of claim 1 wherein the configuration information specifies whether closed loop MIMO, open loop MIMO or SISO is to be used.

7. A method of implementing communication frames in a wireless network having a plurality of wireless devices, some of said devices have different physical layer configurations than other of said devices, comprising:

(a) forming a non-polling frame including at least one bit in which physical layer configuration information is encoded, said configuration information specifies whether a single input single output (SISO) antenna configuration is to be used or a multiple input multiple output (MIMO) antenna configuration is to be used;

(b) transmitting said non-polling frame to a receiving device for decoding by said receiving device; and (c) configuring a physical layer of said receiving device in accordance with the physical layer configuration information contained in the non-polling frame.

8. The method of claim 7 wherein the at least one bit comprises a plurality of bits that are also used to encode a value that is indicative of a transmission opportunity time period.

9. The method of claim 7 wherein (a) also includes forming the non-polling frame to include a more bit that specifies whether a subsequent frame of data is to follow the current non-polling frame.

10. The method of claim 9 wherein (c) is performed if said more bit is set to indicate that a subsequent frame of data is to follow the current non-polling frame.

11. A method of coordinating the behavior of a plurality of wireless devices in a wireless network, comprising:

(a) forming a frame to a wireless receiving device to specify the antenna configuration that the receiving device is to use for a subsequent communication;

(b) sending said frame to said receiving device;

(c) receiving said frame by said receiving device; (d) decoding said frame; and (e) configuring said receiving device to comport with the antenna configuration specified by said frame.

12. The method of claim 11 wherein said antenna configuration comprises a configuration selected from the group consisting of multiple input multiple output (MIMO) and single input single output (SISO).

13. The method of claim 11 wherein said antenna configuration comprises a configuration selected from the group consisting of open loop multiple input multiple output (MIMO), closed loop MIMO, and single input single output (SISO).

14. An access point usable to communicate across a wireless network, comprising:

a host device;

a medium access control (MAC) sublayer coupled to said host device; and a physical layer coupled to said MAC sublayer; wherein said MAC sublayer forms frames to send to wireless receiving stations in said network, said frames specifying the antenna configuration that the receiving stations are to use for a subsequent communication.

15. The access point of claim 14 wherein said antenna configuration comprises a configuration selected from the group consisting of multiple input multiple output (MIMO) and single input single output (SISO).

16. The access point of claim 14 wherein said antenna configuration comprises a configuration selected from the group consisting of open loop multiple input multiple output (MIMO), closed loop MIMO, and single input single output (SISO).

17. The access point of claim 14 wherein said antenna configuration is encoded in a plurality of bits in said frames that are also used for other purposes than encoding antenna configuration.

* * * * *